United States Patent
Shih et al.

(10) Patent No.: US 7,818,126 B2
(45) Date of Patent: Oct. 19, 2010

(54) COMMUNICATION METHOD AND COMMUNICATION SYSTEM

(75) Inventors: Kwang-Yan Shih, Taipei (TW); Jia-Chi Lee, Taipei (TW)

(73) Assignee: Inventec Corporation, Taipei (TW)

( * ) Notice: Subject to any disclaimer, the term of this patent is extended or adjusted under 35 U.S.C. 154(b) by 905 days.

(21) Appl. No.: 11/710,953

(22) Filed: Feb. 27, 2007

(65) Prior Publication Data

US 2008/0208470 A1 Aug. 28, 2008

(51) Int. Cl.
*G01C 21/00* (2006.01)

(52) U.S. Cl. ........................ 701/213; 701/200

(58) Field of Classification Search ............... None
See application file for complete search history.

(56) References Cited

U.S. PATENT DOCUMENTS

| | | | |
|---|---|---|---|
| 6,678,750 B2 * | 1/2004 | Meade et al. | 710/7 |
| 7,474,962 B2 * | 1/2009 | Waid et al. | 701/213 |
| 2002/0162011 A1 * | 10/2002 | Tanaka et al. | 713/200 |
| 2002/0169551 A1 * | 11/2002 | Inoue et al. | 701/213 |

* cited by examiner

*Primary Examiner*—Khoi Tran
*Assistant Examiner*—Bhavesh V Amin
(74) *Attorney, Agent, or Firm*—Muncy, Geissler, Olds & Lowe, PLLC

(57) ABSTRACT

A communication method is applied to a first peripheral communication device and a communication device. The communication device has a data exchanging module, a GPS module electrically connected to the data exchanging module, and a Bluetooth communication module electrically connected to the data exchanging module. The communication method includes the following steps. First, the first peripheral communication device outputs a first Bluetooth signal carrying first GPS data. Next, the data exchanging module receives the first GPS data from the Bluetooth communication module and transmits the first GPS data to the GPS module. Then, the GPS module calculates a first GPS position of the communication device through a position algorithmic process according to the first GPS data.

16 Claims, 10 Drawing Sheets

COMMUNICATION METHOD AND COMMUNICATION SYSTEM

BACKGROUND OF THE INVENTION

1. Field of Invention

The invention relates to communication technology and, in particular, to a communication method and a communication system, which have a positioning function.

2. Related Art

With the development of communication technology, communication devices have become an indispensable part of human daily life. Users may use the communication devices to upload and download data or to talk with each other. Of course, the user may also use the communication device to position his/her location.

Referring to FIG. 1, a conventional communication device 1 used in conjunction with a plurality of satellites (not shown) includes a storage module 11, a GPS module 12, a register 13 and a display module 14. The storage module 11 stores map data 111. The GPS module 12 receives a plurality of GPS signals 121 outputted from the satellites, and calculates longitudinal-latitudinal coordinate data 122 of the communication device 1 according to the GPS signals 121. The register 13 is electrically connected to the GPS module 12, the storage module 11 and the display module 14 so that the longitudinal-latitudinal coordinate data 122 and the map data 111 may be transmitted to the display module 14. At this time, the user may find his/her position or the position of the communication device 1 according to the map data 111 displayed on the display module 14.

However, when the communication device 1 is influenced by the weather, the environment and/or shielding, the communication device 1 can only receive weak GPS signals 121 if at all. In this case, the positioning quality of the communication device 1 is poor, and the time required for positioning is increased.

Therefore, it is an important subject of the invention to provide a communication method and a communication system, which can solving the above-mentioned problems.

SUMMARY OF THE INVENTION

In view of the foregoing, the invention is to provide a communication method and a communication system, which can receive GPS information and calculate a local position under the influences of the weather, the environment and shielding.

To achieve the above, a communication method of the invention is applied to a first peripheral communication device and a communication device, both of which communicate with each other according to a Bluetooth communication protocol. The communication device has a data exchanging module, a GPS module and a Bluetooth communication module. The data exchanging module is electrically connected to the Bluetooth communication module. The GPS module is electrically connected to the data exchanging module. The communication method includes the following steps. First, the first peripheral communication device outputs a first Bluetooth signal carrying first GPS data. Next, the data exchanging module receives the first GPS data from the Bluetooth communication module and transmits the first GPS data to the GPS module. Then, the GPS module calculates a first GPS position of the communication device through a position algorithmic process according to the first GPS data.

To achieve the above, the invention also discloses a communication system, which includes a first peripheral communication device and a communication device. The first peripheral communication device outputs a first Bluetooth signal carrying first GPS data. The communication device communicates with the first peripheral communication device according to a Bluetooth communication protocol, and has a data exchanging module, a GPS module and a Bluetooth communication module. The data exchanging module is electrically connected to the Bluetooth communication module, and the GPS module is electrically connected to the data exchanging module. The data exchanging module receives the first GPS data from the Bluetooth communication module and transmits the first GPS data to the GPS module. The GPS module calculates a first GPS position of the communication device through a position algorithmic process according to the first GPS data.

As mentioned above, the communication device in the communication system of the invention and the first peripheral communication device communicate with each other according to the Bluetooth communication protocol so as to receive the first Bluetooth signal carrying the first GPS data and to calculate the first GPS position of the communication device through the position algorithmic process according to the first GPS data. Therefore, the communication device and the communication system of the invention still can receive the first GPS data through the first peripheral communication device to calculate the position of the communication device under the influences of the weather, the environment and shielding. Thus, the positioning time and quality can be enhanced, and the positioning range of the communication device can be enlarged.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
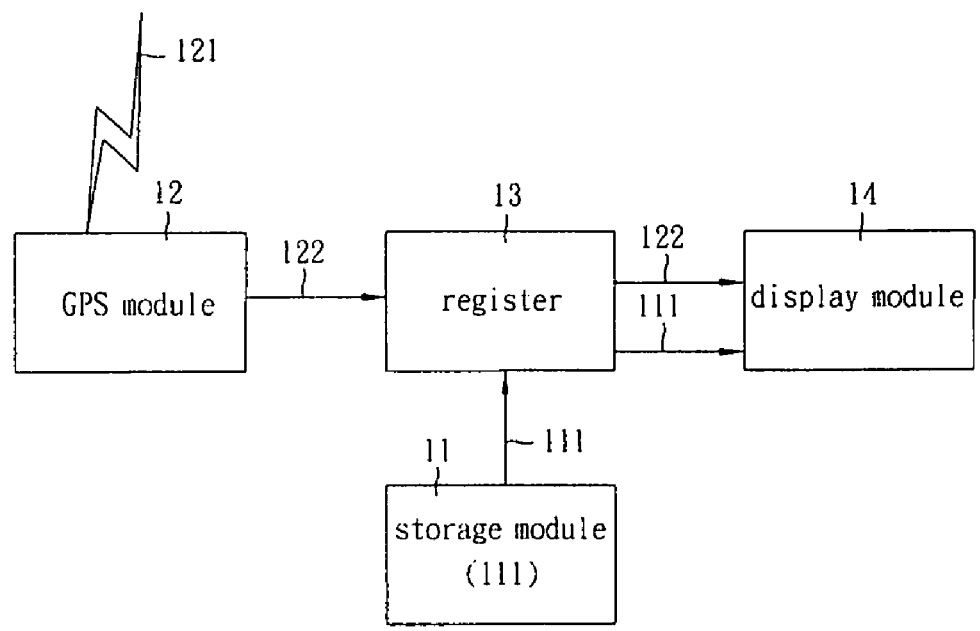
FIG. 1 is a schematic illustration showing a conventional communication device.
Figure 2:
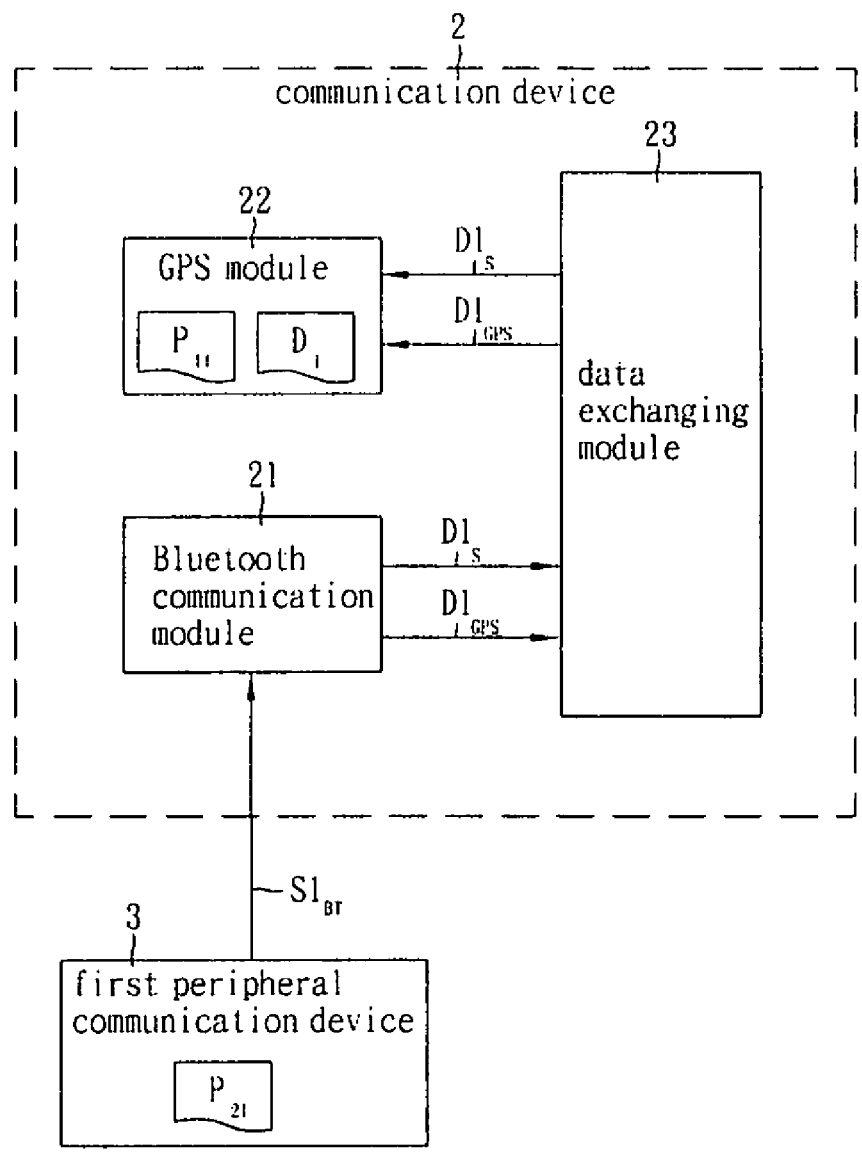
FIG. 2 is a schematic block diagram showing a communication system according to a preferred embodiment of the invention.

Referring to FIG. 2, a communication system $S_0$ according to the preferred embodiment of the invention includes a communication device 2 and a first peripheral communication device 3. The communication device 2 includes a Bluetooth communication module 21, a GPS module 22 and a data exchanging module 23.

The Bluetooth communication module 21 receives a first Bluetooth signal $S1_{BT}$, which carries first GPS data $D1_{GPS}$. In this embodiment, the Bluetooth communication module 21 may be actually implemented by a Bluetooth radio frequency unit and a Bluetooth baseband unit.

The data exchanging module 23 is electrically connected to the Bluetooth communication module 21 and the GPS module 22 and outputs the first GPS data $D1_{GPS}$ to the GPS module 22 according to the first Bluetooth signal $S1_{BT}$. In this embodiment, the data exchanging module 23 receives the first GPS data $D1_{GPS}$ from the Bluetooth communication module 21, and transmits the first GPS data $D1_{GPS}$ to the GPS module 22. In addition, the data exchanging module 23 may be actually implemented by a universal asynchronous receiver/transmitter (UART).

The GPS module 22 calculates a first GPS position $P_{11}$ of the communication device 2 through a position algorithmic process according to the first GPS data $D1_{GPS}$, wherein the first GPS position $P_{11}$ of the communication device 2 may be longitudinal and latitudinal coordinates and time of the communication device 2. In this embodiment, the position algorithmic process is a triangular positioning algorithmic process, for example. Of course, the position algorithmic process may also be any other algorithmic process for determining position.

For example, as shown in FIG. 2, the communication device 2 and the first peripheral communication device 3 may communicate with each other to share information according to a Bluetooth communication protocol. The first peripheral communication device 3 can output the first Bluetooth signal $S1_{BT}$ to the communication device 2 to provide the first GPS data $D1_{GPS}$ to the communication device 2, and the Bluetooth communication module 21 outputs first signal intensity data $D1_S$ to the GPS module 22 through the data exchanging module 23 according to the signal intensity of the first Bluetooth signal $S1_{BT}$. The first GPS data $D1_{GPS}$ may include a second GPS position $P_{21}$ of the first peripheral communication device 3, and the second GPS position $P_{21}$ of the first peripheral communication device 3 may be calculated by the first peripheral communication device 3 according to GPS signals (not shown) outputted from a plurality of satellites (not shown). In addition, the first GPS data $D1_{GPS}$ may further contain relative errors (ionosphere errors or satellite clock errors) between the first peripheral communication device 3 and the satellites according to the actual requirement. At this time, the GPS module 22 calculates an effective distance $D_1$ between the communication device 2 and the first peripheral communication device 3 according to the first signal intensity data $D1_S$, and then roughly estimates the first GPS position $P_{11}$ (the longitudinal and latitudinal coordinates and time of the communication device 2) according to the effective distance $D_1$ extended from the first GPS data $D1_{GPS}$ (the longitudinal and latitudinal coordinates and time of the first peripheral communication device 3).

Figure 3:
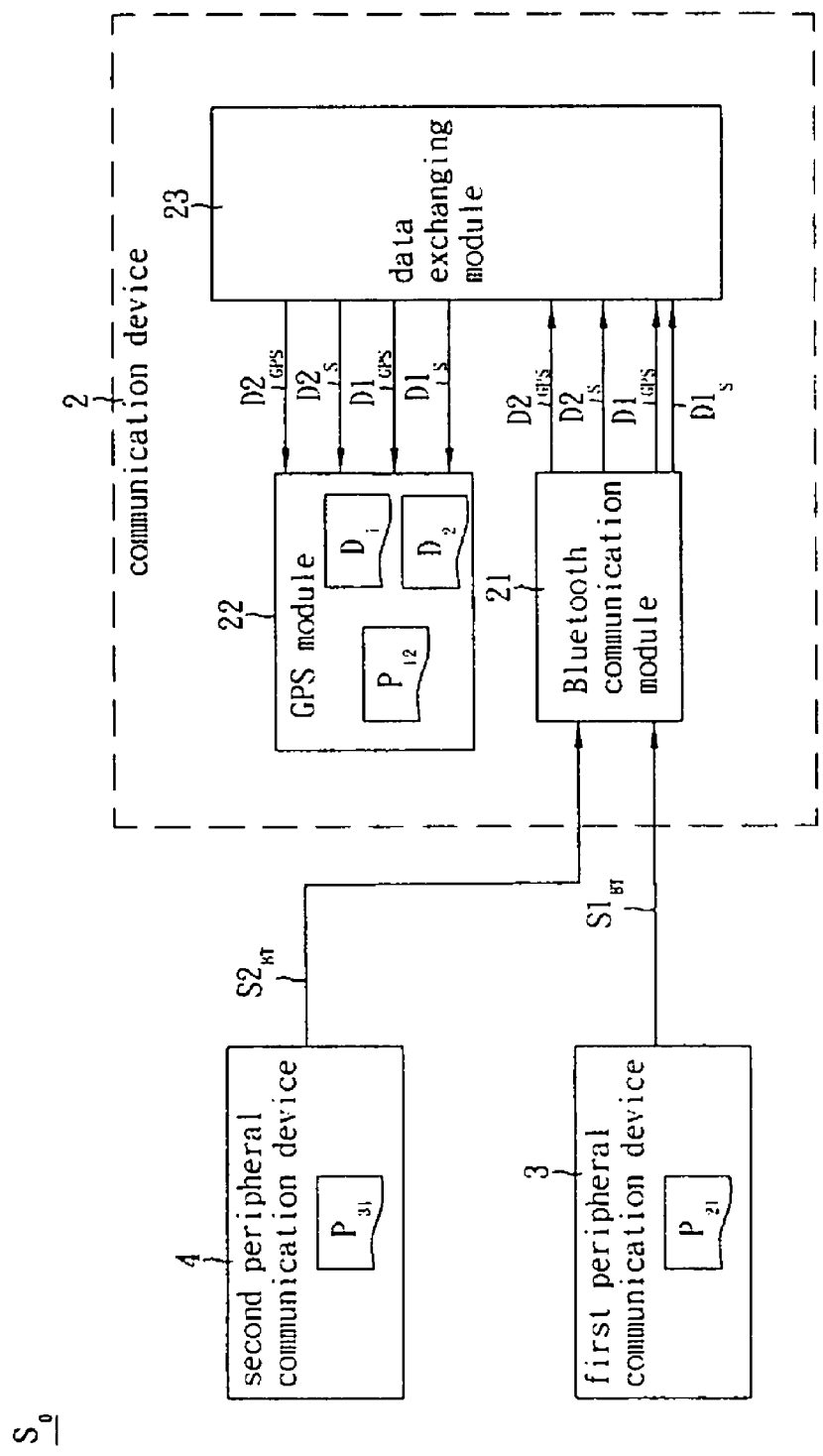
FIG. 3 is a schematic block diagram showing a communication system according to the preferred embodiment of the invention, wherein the communication device is further used in conjunction with a second peripheral communication device.
Figure 4:
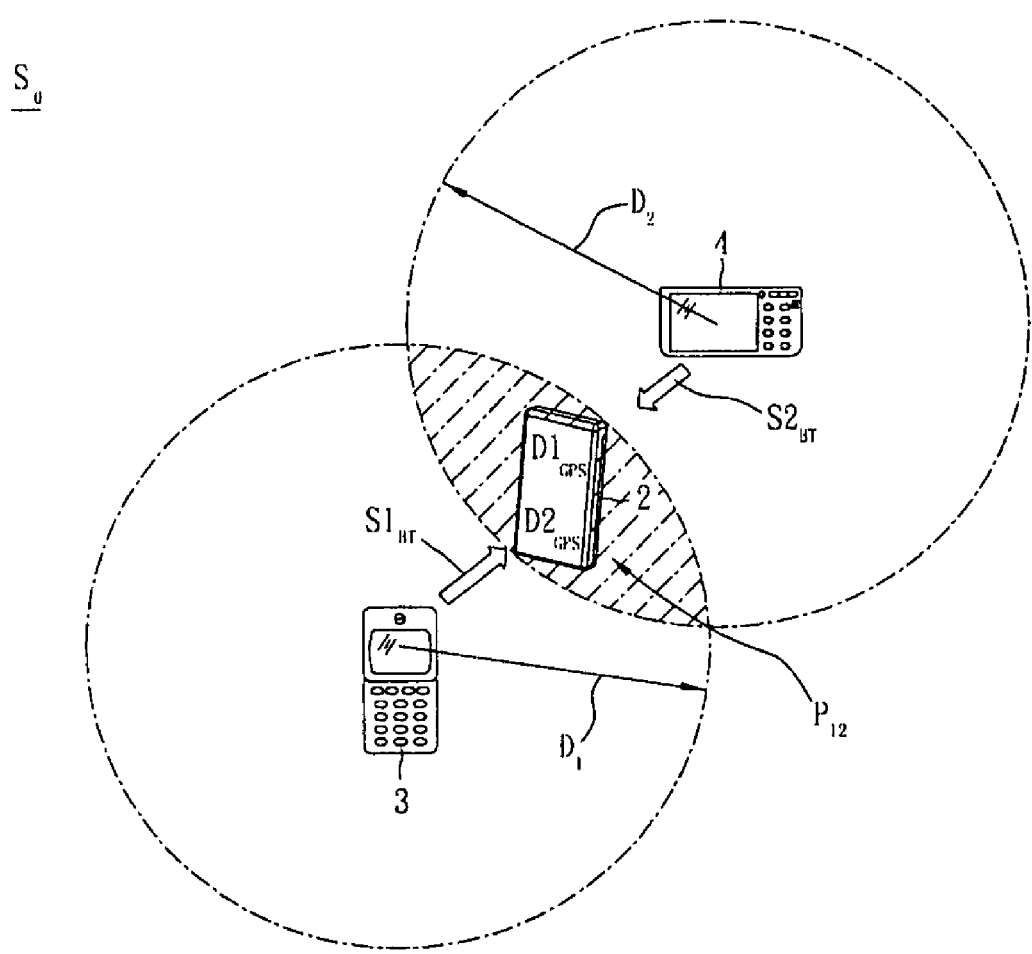
FIG. 4 is a schematic illustration showing the communication system of FIG. 3.

Referring to FIGS. 3 and 4, the communication system $S_0$ further includes a second peripheral communication device 4. The communication device 2 and the second peripheral communication device 4 may further communicate with each other to share information according to the Bluetooth communication protocol. The second peripheral communication device 4 may output a second Bluetooth signal $S2_{BT}$, and the Bluetooth communication module 21 of the communication device 2 receives the second Bluetooth signal $S2_{BT}$ and outputs second signal intensity data $D2_S$ according to the signal intensity of the second Bluetooth signal $S2_{BT}$. The data exchanging module 23 receives second GPS data $D2_{GPS}$ and the second signal intensity data $D2_S$ from the Bluetooth communication module 21 and transmits the second GPS data $D2_{GPS}$ and the second signal intensity data $D2_S$ to the GPS module 22. At this time, the GPS module 22 calculates the effective distance $D_1$ between the communication device 2 and the first peripheral communication device 3 according to the first signal intensity data $D2_S$, calculates an effective distance $D_2$ between the communication device 2 and the second peripheral communication device 4 according to the second signal intensity data $D2_S$, and then calculates a first GPS position $P_{12}$ (the longitudinal and latitudinal coordinates and time of the communication device 2) according to an interlaced region of the effective distance $D_1$ extended from the first GPS data $D1_{GPS}$ (the longitudinal and latitudinal coordinates and the time of the first peripheral communication device 3) and the effective distance $D_2$ extended from the second GPS data $D2_{GPS}$ (the longitudinal and latitudinal coordinates and time of the second peripheral communication device 4).

The second GPS data $D2_{GPS}$ may include a third GPS position $P_{31}$ of the second peripheral communication device 4. Of course, the second GPS data $D2_{GPS}$ may also include relative errors (the ionosphere errors or the satellite clock errors) between the second peripheral communication device 4 and a plurality of satellites (not shown). As mentioned hereinabove, the communication device 2 calculates the first GPS position $P_{12}$ according to the effective distances $D_1$ and $D_2$, and the first GPS data $D1_{GPS}$ and the second GPS data $D2_{GPS}$ (the GPS data and the effective distances extended therefrom). So, the precision of the first GPS position $P_{12}$ may be higher than that of the first GPS position $P_{11}$, as shown in FIG. 2.

Figure 5:
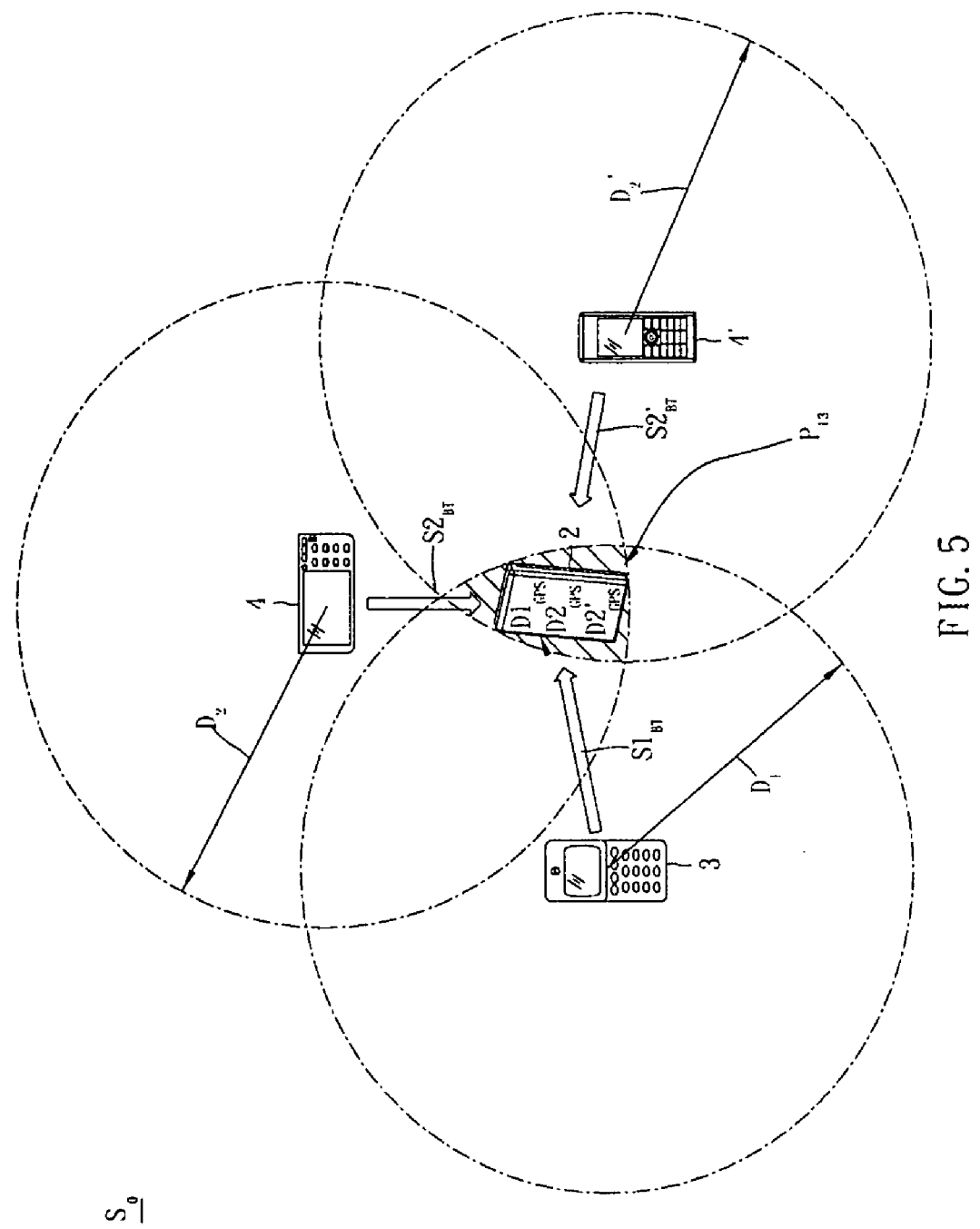
FIG. 5 is a schematic block diagram showing a communication system according to the preferred embodiment of the invention, wherein the communication device is further used in conjunction with two second peripheral communication devices.

Of course, with the increase of the peripheral communication devices used in conjunction with the communication device 2, a positioning network may be formed around the communication device 2 so that the actual positioning may be calculated more precisely. For example, as shown in FIG. 5, if the communication system $S_0$ further includes another second peripheral communication device 4' and the communication device 2 receives a second Bluetooth signal $S2'_{BT}$ outputted from the second peripheral communication device 4' and calculates second GPS data $D2'_{GPS}$, the communication device 2 can calculate a first GPS position $P_{13}$ more precisely according to an interlaced region of the effective distance $D_1$ extended from the first GPS data $D1_{GPS}$ (the longitudinal and latitudinal coordinates and time of the first peripheral communication device 3), the effective distance $D_2$ extended from the second GPS data $D2_{GPS}$ (the longitudinal and latitudinal coordinates and time of the second peripheral communication device 4), and the effective distance $D'_2$ extended from the second GPS data $D2'_{GPS}$ (the longitudinal and latitudinal coordinates and time of the second peripheral communication device 4'). Similarly, if the communication device 2 is used in conjunction with n peripheral communication devices, the communication device 2 may calculate the most precise first GPS position through a minimum square root or other approximating methods according to an interlaced region of n effective distances extended corresponding to the GPS data.

Figure 6:
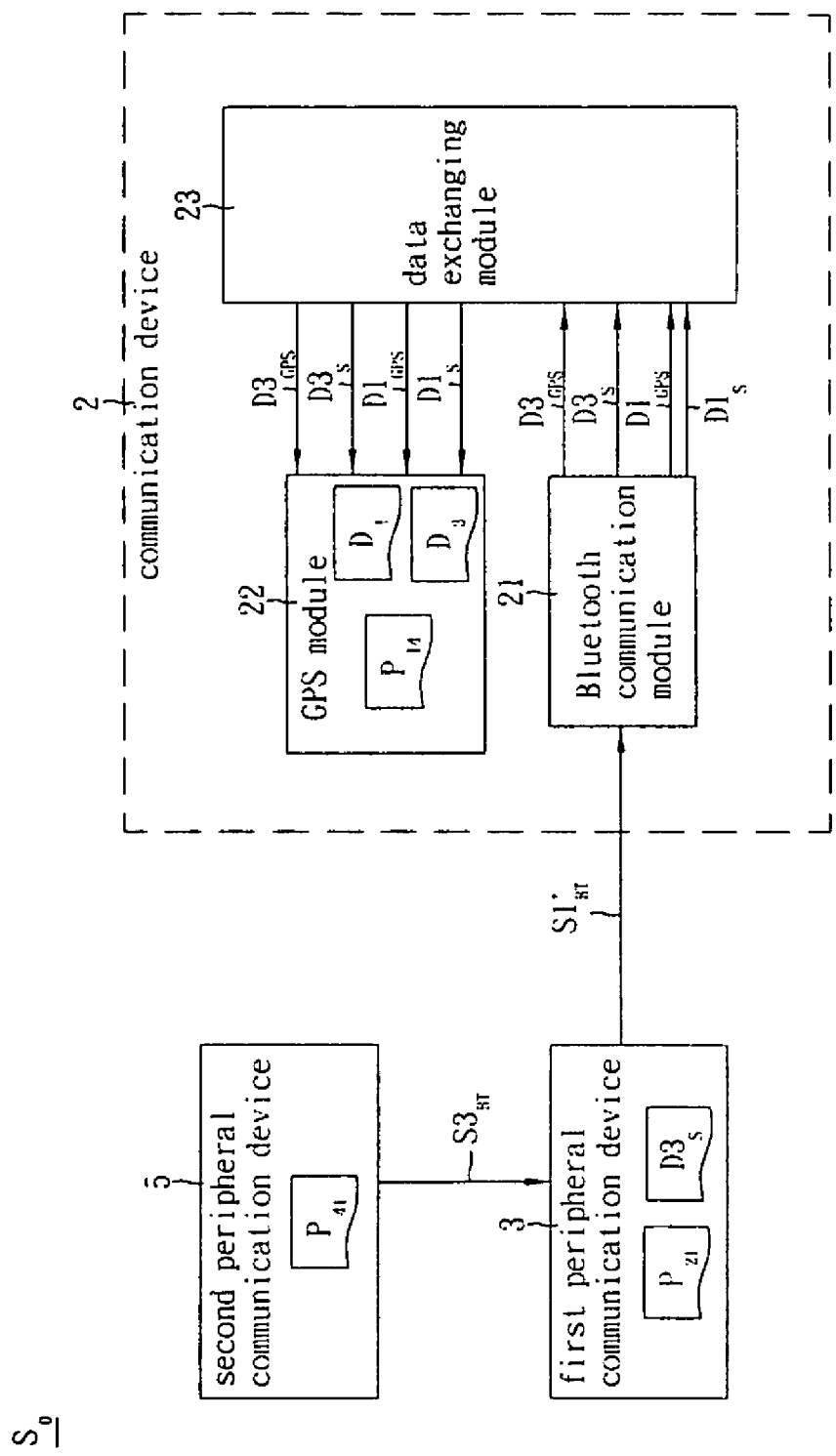
FIG. 6 is a schematic block diagram showing another communication system according to the preferred embodiment of the invention, wherein the communication device is further used in conjunction with a third peripheral communication device.

In addition, as shown in FIG. 6, the communication system $S_0$ further includes a third peripheral communication device 5. The communication device 2 may also be used in conjunction with the third peripheral communication device 5, and the third peripheral communication device 5 and the first peripheral communication device 3 communicate with each other to share information according to the Bluetooth communication protocol. For example, the third peripheral communication device 5 may output a third Bluetooth signal $S3_{BT}$ to the first peripheral communication device 3, and the third Bluetooth signal $S3_{BT}$ carries third GPS data $D3_{GPS}$, which may include a fourth GPS position $P_{41}$ of the third peripheral communication device 5, or may have relative errors (the ionosphere errors or the satellite clock errors) between the third peripheral communication device 5 and a plurality of satellites (not shown). In addition, the first peripheral communication device 3 may generate third signal intensity data $D3_S$ according to the signal intensity of the third Bluetooth signal $S3_{BT}$.

At this time, the first peripheral communication device 3 again outputs a first Bluetooth signal $S1'_{BT}$, which carries the first GPS data $D1_{GPS}$, the third signal intensity data $D3_S$ and the third GPS data $D3_{GPS}$, to the communication device 2 so as to provide the first GPS data $D1_{GPS}$, the third signal intensity data $D3_S$ and the third GPS data $D3_{GPS}$ to the GPS module 22. The GPS module 22 calculates the effective distance $D_1$ between the communication device 2 and the first peripheral communication device 3 according to the first signal intensity data $D1_S$, calculates an effective distance $D_3$ between the first peripheral communication device 3 and the third peripheral communication device 5 according to the third signal intensity data $D3_S$, and then calculates a first GPS position $P_{14}$ of the communication device 2 according to the interlaced region of the effective distance $D_1$ extended from the first GPS data $D1_{GPS}$ and the effective distance $D_3$ extended from the third GPS data $D3_{GPS}$.

Figure 7:
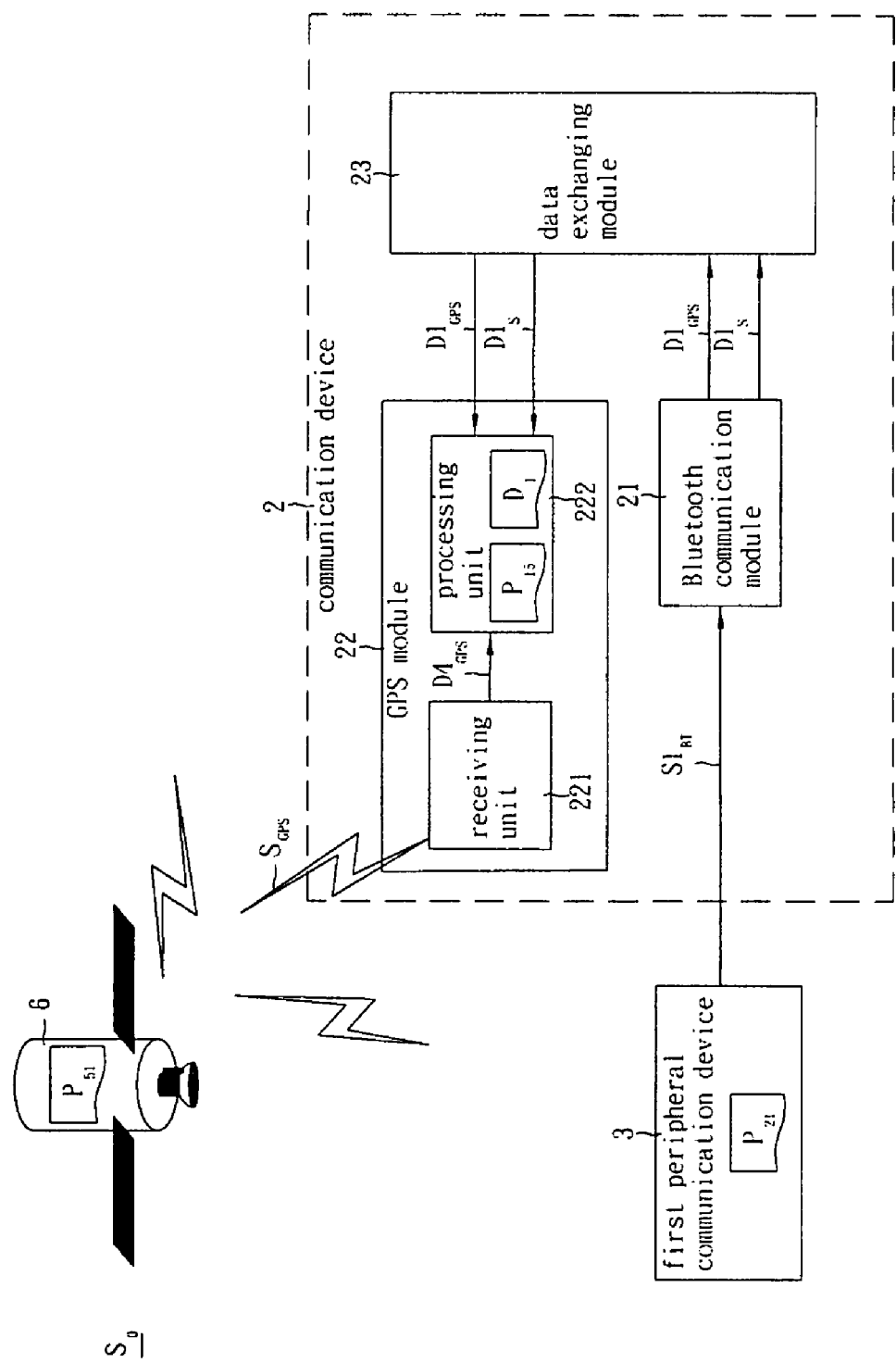
FIG. 7 is a schematic block diagram showing still another communication system according to the preferred embodiment of the invention, wherein the communication device is further used in conjunction with a satellite.

Furthermore, referring to FIG. 7, the GPS module 22 may have a receiving unit 221 and a processing unit 222. The receiving unit 221 may receive at least one GPS signal $S_{GPS}$, which has fourth GPS data $D4_{GPS}$. The processing unit 222 is electrically connected to the receiving unit 221 to receive the fourth GPS data $D4_{GPS}$ and calculates a first GPS position $P_{15}$ of the communication device 2 according to the first GPS data $D1_{GPS}$ and the fourth GPS data $D4_{GPS}$. In this embodiment, the communication device 2 is used in conjunction with at least one satellite 6, which broadcasts the GPS signal $S_{GPS}$ to the communication device 2. The fourth GPS data $D4_{GPS}$ in the GPS signal $S_{GPS}$ includes a fifth GPS position $P_{51}$ of the satellite 6.

As mentioned hereinabove, the communication device 2 may be used in conjunction with the first peripheral communication device 3, the second peripheral communication device 4, the third peripheral communication device 5 and the satellite 6 according to the actual requirement so as to receive the GPS data ($D1_{GPS}$, $D2_{GPS}$, $D3_{GPS}$, $D4_{GPS}$) and calculate the first GPS position of the communication device 2 through the position algorithmic process under the influences of the weather, the environment and shielding. Thus, the positioning time and quality can be improved and the positioning range of the communication device 2 may be enlarged. In addition, it is to be noted that this embodiment only discloses the case that the communication device 2 receives the GPS data coming from everywhere for the subsequent positioning. In practice, however, the communication device 2 may also serve as a peripheral communication device to provide GPS data (longitudinal and latitudinal coordinates and time of the communication device 2) to other communication devices, which need to be positioned, and detailed descriptions thereof will be omitted.

Figure 8:
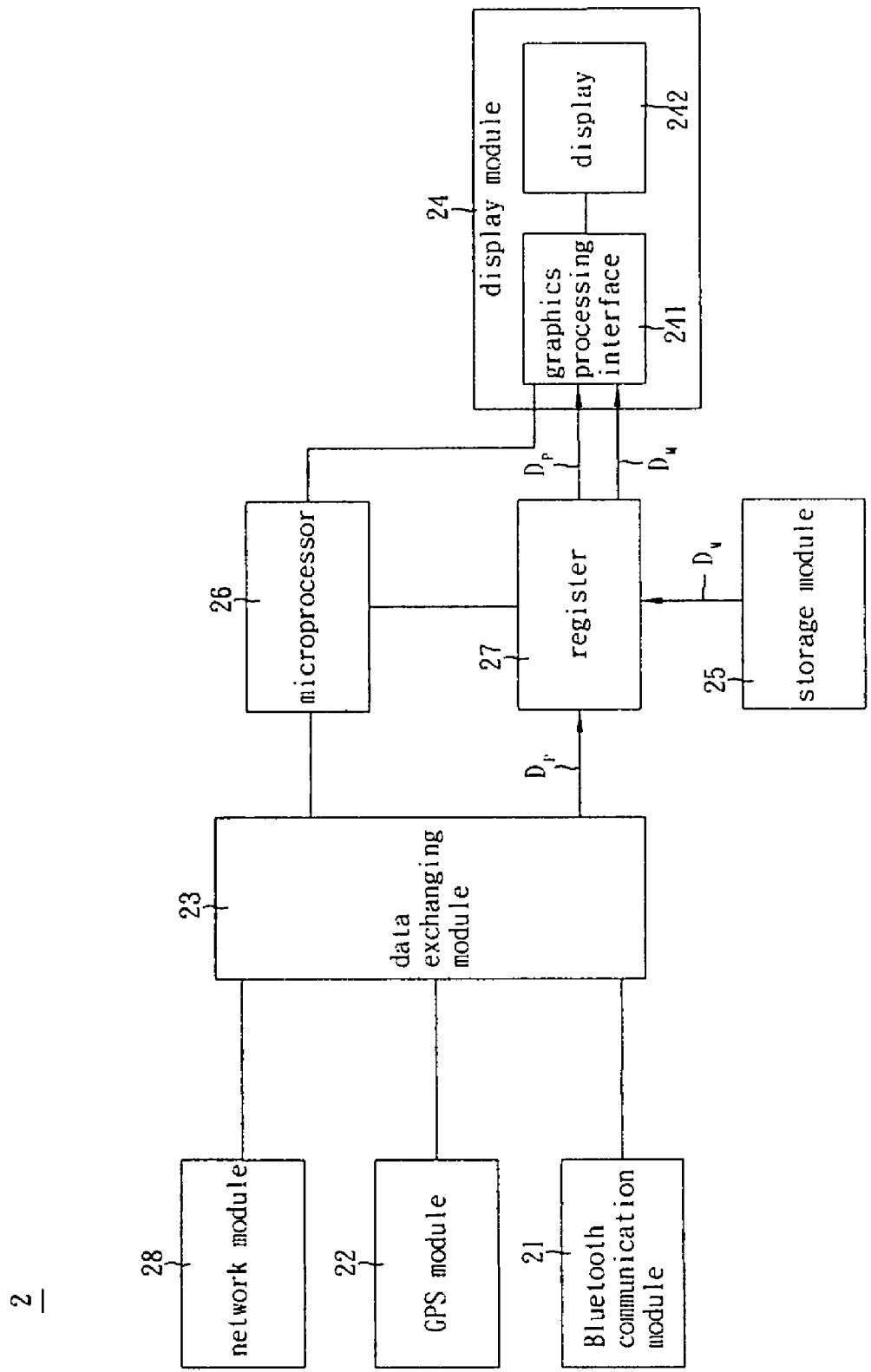
FIG. 8 is a schematic block diagram showing yet still another communication system according to the preferred embodiment of the invention, wherein the communication device further includes a display module and a storage module.

Referring to FIG. 8, the communication device 2 further includes a display module 24, a storage module 25, a microprocessor 26, a register 27 and a network module 28. The display module 24 may have a graphics processing interface 241 and a display 242, and the storage module 25 stores map data $D_M$.

The microprocessor 26 is electrically connected to the data exchanging module 23, the register 27 and the display module 24 to control the operations of the data exchanging module 23, the register 27 and the display module 24. The GPS module 22 outputs position data $D_P$ to the data exchanging module 23 according to the first GPS position, and the position data $D_P$ includes a GPS position of the communication device 2. The register 27 is electrically connected to the data exchanging module 23, the storage module 25 and the display module 24 to transmit the position data $D_P$ and the map data $D_M$ to the graphics processing interface 241, which processes the data and then outputs the processed data to the display 242 for display. At this time, the user can find his/her position or the position of the communication device 2 according to the map data $D_M$ displayed on the display 242.

In addition, the data exchanging module 23 may transmit the position data $D_P$ to the Bluetooth communication module 21 or the network module 28 in the format of multicast packets to share the position data $D_P$ of the communication device 2 with the other communication devices, which need to be positioned, or transmit the position data $D_P$ to a recording server (not shown). Thus, the communication device 2 can be more thoroughly and conveniently tracked.

In order to make the invention clearer, an example will be illustrated to describe how the communication device 2 and the other peripheral communication devices communicate with each other to share the GPS data.

Figure 9:
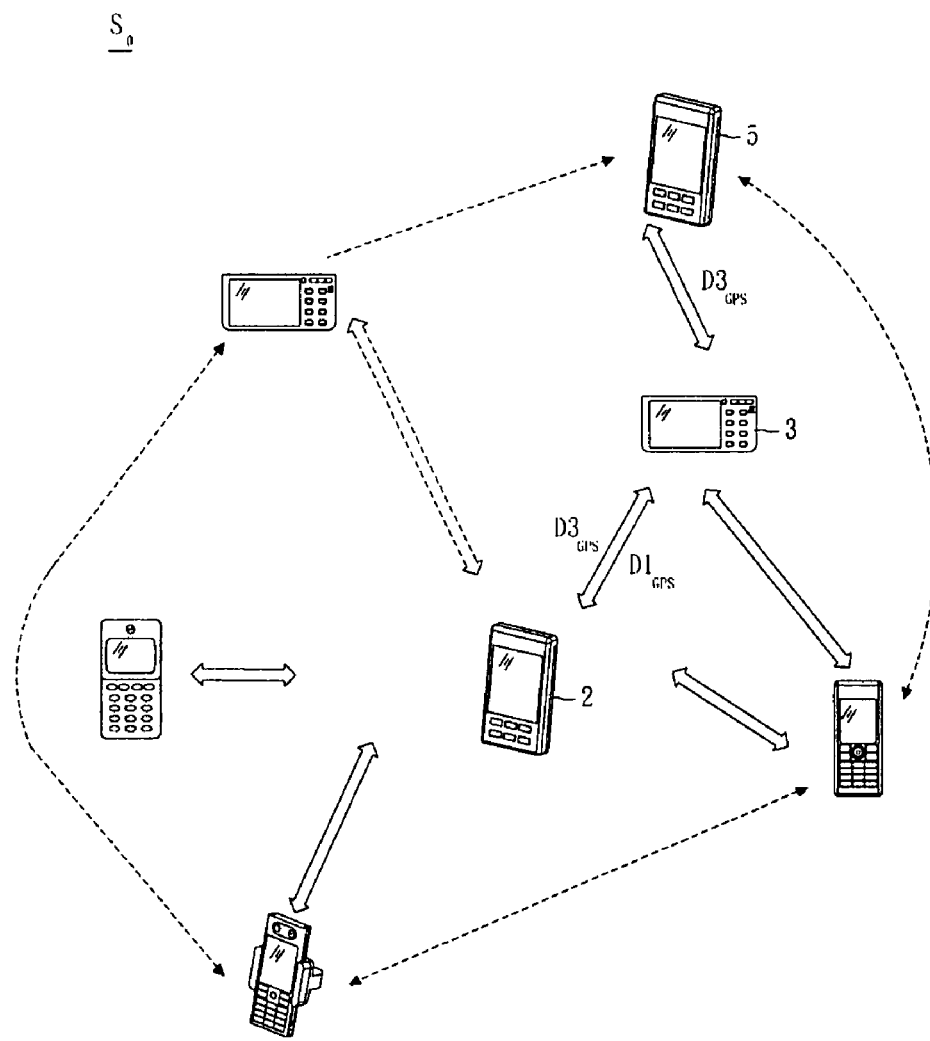
FIG. 9 is another schematic illustration showing the communication system according to the preferred embodiment of the invention, wherein a virtual antenna plane is formed between the communication device and other peripheral communication devices.

Referring to FIG. 9, the communication device 2, the first peripheral communication device 3 and the third peripheral communication device 5 communicate with one another according to the Bluetooth communication protocol in a multicast manner, and have the functions of grouping operation mode and member authentication. In this embodiment, assume the communication device 2, the first peripheral communication device 3 and the third peripheral communication device 5 are in the same group, the first peripheral communication device 3 is the master, and the communication device 2 and the third peripheral communication device 5 are slaves. In this case, the communication device 2 and the third peripheral communication device 5 automatically search for the first peripheral communication device 3. If the distances between the first peripheral communication device 3 and the communication device 2 and the third peripheral communication device 5 meet the specification (within about 100 meters) of the Bluetooth communication protocol, the first peripheral communication device 3 may serve as a medium between the communication device 2 and the third peripheral communication device 5 to share information. For example, if the communication device 2 is influenced by the weather, the environment or shielding and thus cannot smoothly receive the GPS signal, the communication device 2 may receive the first GPS data $D1_{GPS}$ and the third GPS data $D3_{GPS}$ through the assistance of the group so as to better position the communication device 2. It is to be noted that the members in the group can be added or deleted according to the actual requirement, and the relationship between the master and the slave may be changed according to the calculation of the weighting coefficient or may be fixed.

As mentioned hereinabove, the communication device 2, the first peripheral communication device 3, the third peripheral communication device 5 and other communication devices in the group may form a virtual antenna plane (VAP), which becomes larger as the number of members of the group becomes greater. Thus, the positioning time and quality can be enhanced, and the positioning range of the communication device can be enlarged.

Figure 10:
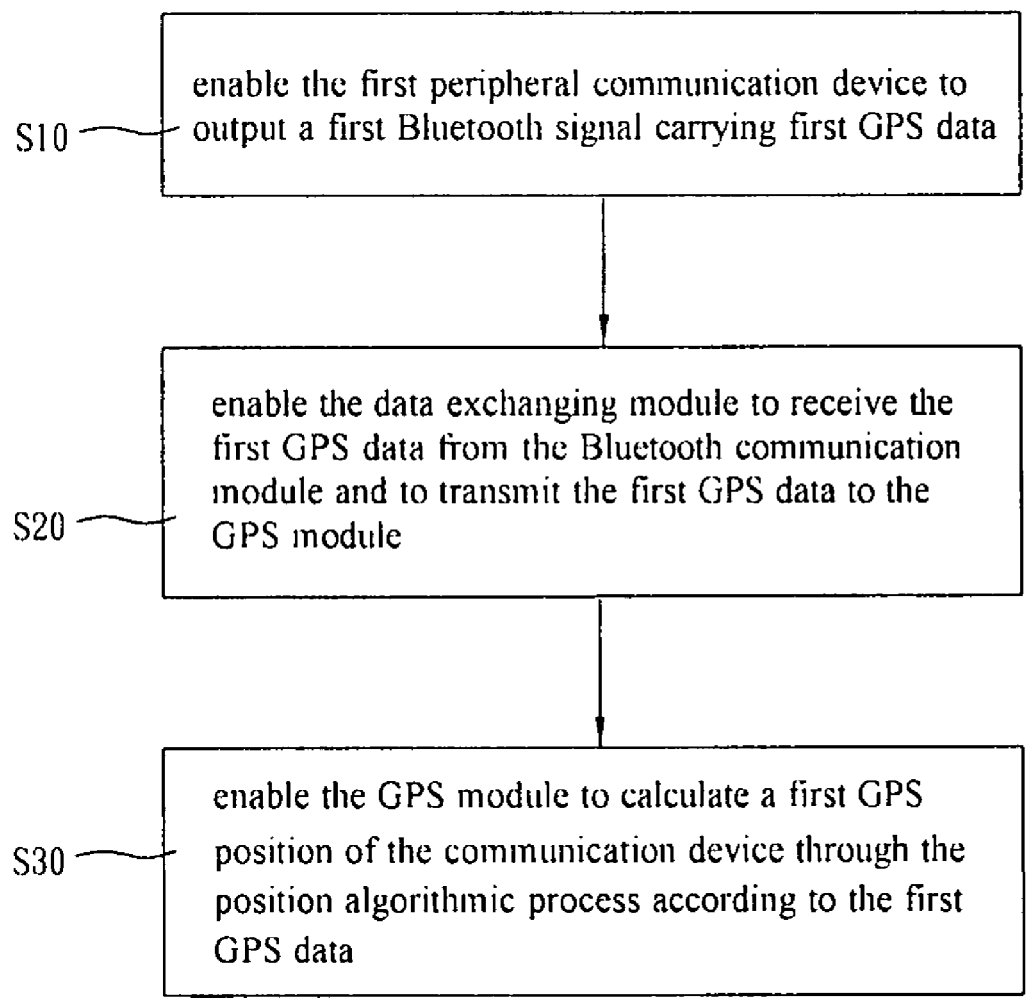
FIG. 10 is a flow chart showing a communication method according to the preferred embodiment of the invention.

In addition, as shown in FIG. 10, a communication method according to the preferred embodiment of the invention is used in conjunction with a first peripheral communication device and a communication device. The communication device and the first peripheral communication device communicate with each other according to the Bluetooth communication protocol. The communication device has a data exchanging module, a GPS module and a Bluetooth communication module. The data exchanging module is electrically connected to the Bluetooth communication module. The GPS module is electrically connected to the data exchanging module. The communication method includes steps S10 to S30.

First, step S10 enables the first peripheral communication device to output a first Bluetooth signal carrying first GPS data.

Next, step S20 enables the data exchanging module to receive the first GPS data from the Bluetooth communication module and to transmit the first GPS data to the GPS module.

Finally, step S30 enables the GPS module to calculate a first GPS position of the communication device through the position algorithmic process according to the first GPS data.

In this embodiment, implementation of the communication method according to the preferred embodiment of the invention has been described in detail in the communication system with reference to FIGS. 2 to 9 according to the preferred embodiment of the invention, so detailed descriptions thereof will be omitted.

In summary, the communication device in the communication system of the invention and the first peripheral communication device communicate with each other according to the Bluetooth communication protocol so as to receive the first Bluetooth signal carrying the first GPS data and to calculate the first GPS position of the communication device through the position algorithmic process according to the first GPS data. So, the communication device and the communication system of the invention still can receive the first GPS data (or other GPS data) through the first peripheral communication device (or other peripheral communication devices) to calculate the position of the communication device under the influences of the weather, the environment and shielding. Thus, the positioning time and quality can be enhanced, and the positioning range of the communication device can be enlarged.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A communication method applied to a first peripheral communication device, a second peripheral communication device, and a communication device, wherein the communication device has a data exchanging module, a GPS module and a Bluetooth communication module, the communication method comprising the steps of:
    enabling the first peripheral communication device to output a first Bluetooth signal carrying first GPS data;
    enabling the second peripheral communication device to output a second Bluetooth signal carrying second GPS data to the communication device;
    enabling the Bluetooth communication module to receive the first Bluetooth signal and the second Bluetooth signal;
    enabling the data exchanging module to receive the first GPS data and the second GPS data from the Bluetooth communication module and transmit the first GPS data and the second GPS data to the GPS module;
    enabling the GPS module to generate a first effective distance between the first peripheral communication device and the communication device according to a signal intensity of the first Bluetooth signal and generate a second effective distance between the second peripheral communication device and the communication device according to a signal intensity of the second Bluetooth signal; and
    enabling the GPS module to calculate a first GPS position of the communication device through the position algorithmic process according to an interlaced region of the first effective distance extended from the first GPS data and the second effective distance extended from the second GPS data.

2. The method according to claim 1, wherein the first GPS data comprises a second GPS position of the first peripheral communication device.

3. The method according to claim 1, wherein the second GPS data comprises a third GPS position of the second peripheral communication device.

4. The method according to claim 1, further applied to a third peripheral communication device, wherein the first Bluetooth signal further carries third GPS data, and the third GPS data comprises a fourth GPS position of the third peripheral communication device.

5. The method according to claim 1, wherein the GPS module has a receiving unit and a processing unit, the receiving unit receives at least one GPS signal having fourth GPS data, and the processing unit is electrically connected to the receiving unit and calculates the first GPS position of the communication device through the position algorithmic process according to the first GPS data and the fourth GPS data.

6. The method according to claim 5, which is used in conjunction with at least one satellite outputting the GPS signal.

7. The method according to claim 1, wherein the GPS module outputs position data to the data exchanging module and the position data comprises the first GPS position of the communication device.

8. The method according to claim 7, wherein the communication device further comprises a storage module for storing map information, and a display module for displaying the map information and the position data.

9. A communication system, comprising:
    a first peripheral communication device for outputting a first Bluetooth signal carrying first GPS data; and a second peripheral communication device for outputting a second Bluetooth signal carrying second GPS data; and
a communication device, which communicates with the first peripheral communication device and the second peripheral communication device, and has a data exchanging module, a GPS module and a Bluetooth communication module, wherein:
the Bluetooth communication module receives the first Bluetooth signal and the second Bluetooth signal;
the data exchanging module is electrically connected to the Bluetooth communication module, wherein the data exchanging module receives the first GPS data and the second GPS data from the Bluetooth communication module and transmits the first GPS data and the second GPS data to the GPS module; and
the GPS module is electrically connected to the data exchanging module, wherein the GPS module generates a first effective distance between the first peripheral communication device and the communication device according to a signal intensity of the first Bluetooth signal, generates a second effective distance between the second peripheral communication device and the communication device according to a signal intensity of the second Bluetooth signal, and then calculates a first GPS position of the communication device through the position algorithmic process according to an interlaced region of the first effective distance extended from the first GPS data and the second effective distance extended from the second GPS data.

10. The communication system according to claim 9, wherein the first GPS data comprises a second GPS position of the first peripheral communication device.

11. The communication system according to claim 9, wherein the second GPS data comprises a third GPS position of the second peripheral communication device.

12. The communication system according to claim 9, further comprising:
a third peripheral communication device, which communicates with the first peripheral communication device, wherein the first Bluetooth signal further carries third GPS data, and the third GPS data comprises a fourth GPS position of the third peripheral communication device.

13. The communication system according to claim 9, wherein the GPS module has a receiving unit and a processing unit, the receiving unit receives at least one GPS signal having fourth GPS data, and the processing unit is electrically connected to the receiving unit and calculates the first GPS position of the communication device through the position algorithmic process according to the first GPS data and the fourth GPS data.

14. The communication system according to claim 13, which is used in conjunction with at least one satellite outputting the GPS signal.

15. The communication system according to claim 9, wherein the GPS module outputs position data to the data exchanging module and the position data comprises the first GPS position of the communication device.

16. The communication system according to claim 15, wherein the communication device further comprises a storage module for storing map information, and a display module for displaying the map information and the position data.

* * * * *